US011704716B2

(12) United States Patent
Morin et al.

(10) Patent No.: US 11,704,716 B2
(45) Date of Patent: Jul. 18, 2023

(54) IDENTIFYING OBJECTS WITHIN AN IMAGE FROM A USER OF AN ONLINE SYSTEM MATCHING PRODUCTS IDENTIFIED TO THE ONLINE SYSTEM BY THE USER

(71) Applicant: Meta Platforms, Inc., Menlo Park, CA (US)

(72) Inventors: Steve Morin, San Francisco, CA (US); Xuewei Ouyang, San Francisco, CA (US); Martin Mroz, San Francisco, CA (US); Anuj Madan, San Mateo, CA (US); Aarati Vijay Soman, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 120 days.

(21) Appl. No.: 16/796,635

(22) Filed: Feb. 20, 2020

(65) Prior Publication Data
US 2021/0150611 A1    May 20, 2021

Related U.S. Application Data

(60) Provisional application No. 62/937,067, filed on Nov. 18, 2019.

(51) Int. Cl.
*G06Q 30/00* (2023.01)
*G06Q 30/0601* (2023.01)
*G06Q 30/0251* (2023.01)

(52) U.S. Cl.
CPC ..... *G06Q 30/0631* (2013.01); *G06Q 30/0253* (2013.01); *G06Q 30/0254* (2013.01); *G06Q 30/0256* (2013.01); *G06Q 30/0641* (2013.01)

(58) Field of Classification Search
CPC .......... G06Q 30/0631; G06Q 30/0253; G06Q 30/0254; G06Q 30/0256; G06Q 30/0641
(Continued)

(56) References Cited

U.S. PATENT DOCUMENTS 10,277,950 B2 * 4/2019 Saxena ............. G06Q 30/0277
2011/0078049 A1 * 3/2011 Rehman ............. G06Q 30/0641
705/27.1

(Continued)

OTHER PUBLICATIONS

Mannes, John: "Facebook's AI unlocks the ability to search photos by what's in them," TechCrunch Feb. 2, 2017, Google, 11 pgs. (Year: 2017).*

(Continued)

*Primary Examiner* — Robert M Pond
(74) *Attorney, Agent, or Firm* — Fenwick & West LLP

(57) ABSTRACT

A user identifies products offered by the user to an online system. The online system identifies a product offered by the user in an image by applying a identification model to the image. If the online system identifies a product in the image with at least a maximum confidence value, the online system automatically tags the post with metadata about the product or suggests a tag to the user. If an object in the image could be one of multiple products, the online system identifies the multiple products to the user, which may be ordered based on confidences of matching the object, allowing the user to select which product is in the image. If the unlisted identifies a product in the image with less than a minimum confidence value, the online system identifies the user's offered products and suggests that the user select a product.

18 Claims, 4 Drawing Sheets

(58) Field of Classification Search
USPC .................................................... 705/26, 27
See application file for complete search history.

(56) References Cited

U.S. PATENT DOCUMENTS

| | | | |
|---|---|---|---|
| 2015/0036919 A1* | 2/2015 | Bourdev | G06V 30/194 |
| | | | 382/156 |
| 2017/0193009 A1* | 7/2017 | Rapantzikos | G06F 16/3344 |
| 2018/0053069 A1* | 2/2018 | Kale | G06V 10/768 |
| 2018/0302682 A1 | 10/2018 | Saxena et al. | |
| 2020/0320112 A1* | 10/2020 | Bansal | G06F 16/3326 |
| 2021/0027083 A1* | 1/2021 | Cohen | G06V 20/10 |
| 2021/0150611 A1* | 5/2021 | Morin | G06Q 30/0256 |

OTHER PUBLICATIONS

European Patent Office, Extended European Search Report, European Patent Application No. 20207024.9, dated Mar. 25, 2021, seven pages.

* cited by examiner

IDENTIFYING OBJECTS WITHIN AN IMAGE FROM A USER OF AN ONLINE SYSTEM MATCHING PRODUCTS IDENTIFIED TO THE ONLINE SYSTEM BY THE USER

CROSS-REFERENCE TO RELATED APPLICATIONS

This application claims the benefit of U.S. Provisional Application No. 62/937,067, filed Nov. 18, 2019, which is incorporated by reference in its entirety.

BACKGROUND

This disclosure relates generally to display of content by an online system, and more specifically to the online system detecting and identifying products identified to the online system within images the online system obtains from the user.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users.

Additionally, many publishing users of an online system offer products for purchase by other users and distribute content items including the offered products to other users via the online system. For example, a publishing user offers home goods for purchase by other user and distributes content items including images of the home goods to other users to increase awareness of the home goods. To provide users with more information about products offered by a publishing user, the publishing user may include a tag having information about a product in a content item including the product. A tag may include a name and a price of the product, as well as a link to purchase the product. Information in the tag is displayed to a user viewing the content item when the user performs a specific interaction with the content item, allowing the user to easily obtain information about the product from the content item.

However, conventional online systems require a publishing user to manually tag different products in a content item when the content item is provided to the online system. To manually tag different products in a content item, a publishing user reviews a corresponding product catalog and compares pictures of different products to products included in the content item. The publishing user then manually adds tags identifying different products from the product catalog matching products in the content item to the content item. This manual identification of products in a content item is resource intensive, involving significant time and computational resources to navigate through the publishing user's product catalog and compare different products to the content item. Because conventional techniques for adding tags identifying products in a content item to the content item are resource intensive, many publishing users will forgo identifying products content items provided to the online system, limiting dissemination of information about products available from the publishing user.

SUMMARY

An online system obtains information from a user identifying products that a user of the online system offers for purchase by other users. The obtained information includes one or more pictures of each product associated with a product identifier, and may also include additional information about each product. For example, the online system obtains a product catalog from a user that includes entries for each product offered by the user. In some embodiments, an entry in the product catalog for a product includes a product identifier of the product, one or more pictures of the product, a name of the product, and a price at which the user offers the product for purchase. An entry in the product catalog for a product may also include a description of the product in some embodiment. Information identifying a product obtained from a user includes multiple pictures of the product in some embodiments, with different pictures corresponding to different positions of the product relative to an image capture device (e.g., a camera) that captured the pictures of the product. The online system stores the information identifying the products offered by the user, which includes one or more pictures of each of the products in association with the user. For example, the online system stores information identifying the products offered by the user in a user profile maintained by the online system for the user or stores the obtained information identifying products offered by the user in association with a user profile identifying the user.

Additionally, the online system obtains a content item from the user for presentation to other users. A content item obtained from a user includes an image or a video, and may also include text data or audio data. In various embodiments, a content item includes any combination of text data, audio data, image data, video data for presentation to other users via the online system. The online system may obtain the content item from the user through a composer interface displayed to the user via a client device associated with the user. Via the composer interface, the user identifies an image for inclusion in the content item to the online system and enters text data for inclusion in the content item for presentation in conjunction with the image. In other embodiments, the user identifies a video for inclusion in the content item to the online system and enters text data for inclusion in the content item for presentation in conjunction with the video.

When an image (or video) included in the content item obtained by the online system includes one or more products offered by the user, the content item may include metadata identifying the products included in the image. In various embodiments, the metadata overlays information describing a product on a portion of the image including the product when a user viewing the content item performs a specific action. For example, if a user viewing the content item accesses or selects the portion of the image including the product, information describing the product, such as a name of the product and a price of the product, are overlaid on the portion of the image including the product. In some embodiments, the information describing the product includes a link that retrieves a page or a website including information about the product or for purchasing the product when selected by the user viewing the image including the product. While this allows other users to more easily identify products offered by the user from the content item, conventional methods for identifying a user's products in an image involve the user manually identifying products in the image to the online system. This manual identification may be time and resource intensive for the user offering the products for purchase.

To simplify identification of the user's products included in an image (or included in a video) of a content item, the online system identifies objects from the image (or from the video) included in the content item. In various embodiments, the online system compares an object (or each object) identified from the image to images of products included in the information identifying products offered by the user that the online system obtained from the user. When comparing an object identified from the image to previously obtained images of products offered by the user, the online system determines confidences of the identified object matching different products offered by the user. To compare the object identified from the image to products offered by the user, the online system applies an identification model to the identified object and to the images obtained from the user of products offered by the user. The online system trains the machine learning identification model from comparisons of objects identified from images to products identified to the online system by various users, and may also account for comparisons of objects to publicly available information identifying different products when training the identification model. The online system trains the identification model to determine a likelihood of an object identified from an image matching a product based on prior matching of objects in images to different products. For example, the online system applies a label indicating a product matching an object identified from the image to characteristics of the object identified from the image. From the labeled characteristics of objects extracted from images, the online system trains the identification model using any suitable training method or combination of training methods (e.g., back propagation to train the identification model if it is a neural network, curve fitting techniques if the identification model is a linear regression). After training, the online system applies the trained identification model to characteristics of objects identified within an image, and the identification model outputs confidences of the object matching different products.

In various embodiments, the online system determines confidences of the identified object matching each product offered by the user and identified to the online system. Alternatively, the online system determines confidences of the identified object matching each of a set of products offered by the user and identified to the online system. In various embodiments, the online system maintains a threshold confidence value and compares confidences of the identified object matching different products offered to the user to the threshold value. Responsive to the online system determining a confidence of the identified object matching a product offered by the user equals or exceeds the maximum confidence value, the online system automatically includes a tag in the content item identifying the product offered by the user to which the identified object has a confidence equaling or exceeding the maximum confidence value. Alternatively, responsive to the online system determining a confidence of the identified object matching a product offered by the user equals or exceeds the threshold confidence value, the online system provides an interface to the user enabling the tag to be included in the content item. For example, the interface displays a suggestion to include a tag in the content item that identifies the product offered by the user to which the identified object has a confidence equaling or exceeding the maximum confidence value in an interface displaying the product offered by the user and the image. The suggestion may include an image of the product previously obtained from the user, as well as other information describing the product (e.g., a name of the product, a description of the product, a price of the product, etc.). A tag corresponding to a product included in the image comprises metadata describing the product offered by the user for which the identified object has a confidence of matching equaling or exceeding the maximum confidence value. In various embodiments, the tag for the product is associated with a location in the image of the identified object and the metadata comprising the tag is displayed at (or proximate to) the location in the image of the identified object when a user viewing the image selects or performs a specific interaction with the image.

If multiple products offered by the user have confidences of matching the identified object equaling or exceeding the threshold confidence value, the online system displays an interface including information identifying each product having a confidence of matching the identified object equaling or exceeding the threshold confidence value to the user. In various embodiments, the online system ranks the products having confidences of matching the identified object equaling or exceeding the threshold confidence value so products of the subset with higher confidences of matching the identified object have higher positions in the ranking and information identifying products having confidences of matching the identified object equaling or exceeding the maximum confidence value in an order corresponding to the ranking. When the user selects displayed information identifying a specific product, the online system includes a tag in the content item identifying the specific product selected by the user, as further described above.

Responsive to determining the confidence of the identified object does not equal or exceed the threshold confidence value of matching at least one product offered by the user, the online system displays information identifying products offered by the user to the user in conjunction with a suggestion to tag the identified object with information identifying a product offered by the user via the interface. In various embodiments, the online system ranks products offered by the user based on their corresponding confidences of matching the identified object so products offered by the user with higher confidences of matching the identified object have higher positions in the ranking. The online system may display information identifying products offered by the user based on the ranking. Alternatively, the online system identifies a set of products offered by the user having at least a threshold position in the ranking and displays information identifying the set of products based on the ranking, while also displaying information identifying other products having less than the threshold position in the ranking (i.e., products not in the identified set) in an order based on the information obtained from the user identifying the products offered for sale. For example, the online system displays information identifying products having the five highest positions in the ranking with relative positions based on the ranking, while displaying information identifying the remaining products offered by the user in an order specified by a product catalog the online system obtained from the user. This allows the user to more efficiently identify a product offered by the user that is included in the image.

After including the tag in the content item, when the online system displays the content item to other users of the online system, a user viewing the content item may retrieve information describing the product from the tag included in the content item. For example, when a user performs a specific interaction with the content item, information identifying the product is retrieved from the tag and displayed in conjunction with the content item. In some embodiments, information identifying the product is retrieved from the tag and is displayed as an overlay on the image in the content item at a location within the image including the object matching the product. For example, a name of the product and a price of the product is displayed at a location within the image including the object matching the product when a user selects the content item. In some embodiments, the tag includes a link to a page or to a website that, when selected by a user to whom the image is displayed, retrieve the page or the website, causing display of the page or the website by a client device displaying the content item. This allows the user offering the products for purchase to more easily distribute information identifying the products for purchase to other users by simplifying identification of the products for purchase within images that the user distributes to other users via the online system. Application of the machine learned identification model to objects identified from an image and to products offered for sale by the user allows the online system to reduce an amount of data the user reviews to identify products within the image by identifying products having greater than a threshold confidence value of matching an identified objects or by displaying products offered by the user to the user in an order based on confidences of different products marching an object identified from the image. This reorganizes display of information identifying products to the user to allow the user to more efficiently select a product corresponding to an object identified in the image.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
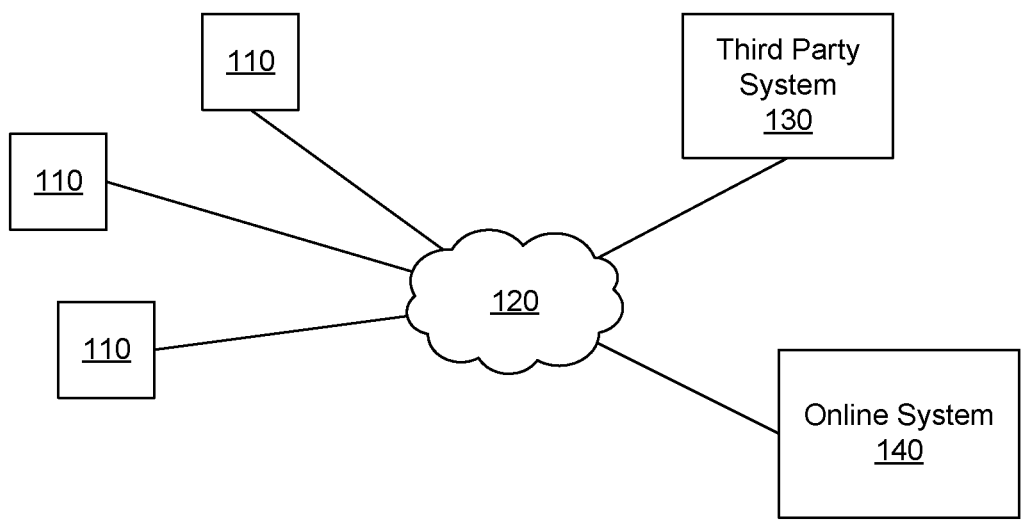
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
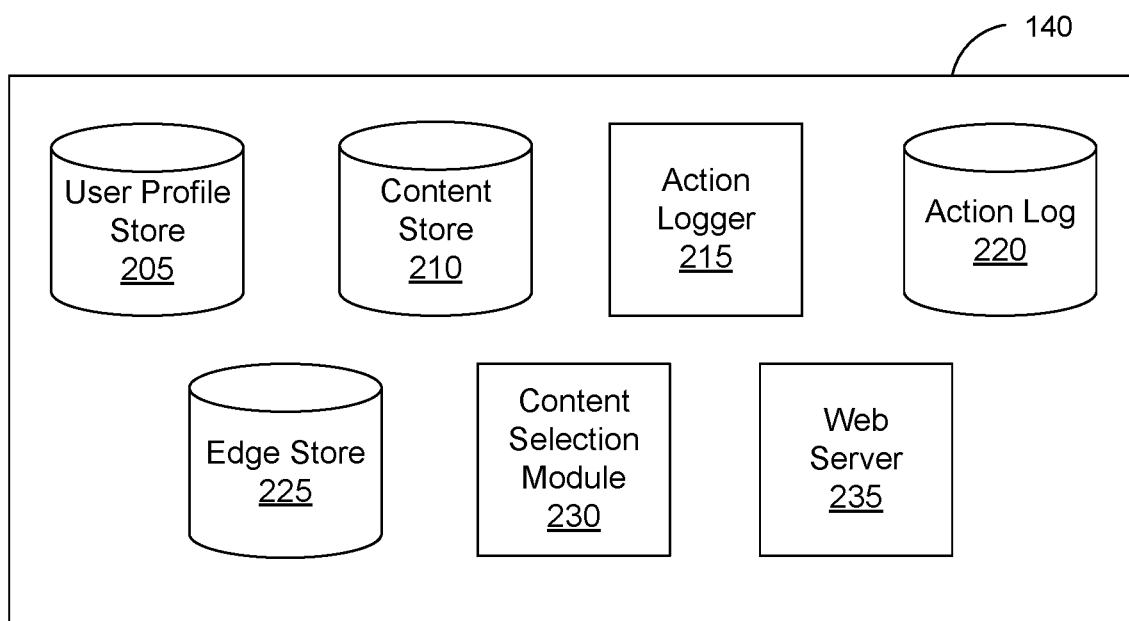
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

In various embodiments, the online system 140 receives information from a user identifying various products that the user offers for purchase. The obtained information includes one or more pictures of each product associated with a product identifier, and may also include additional information about each product. For example, the online system 140 obtains a product catalog from a user that includes entries for each product offered by the user. In some embodiments, an entry in the product catalog for a product includes a product identifier of the product, one or more pictures of the product, a name of the product, and a price at which the user offers the product for purchase. An entry in the product catalog for a product may also include a description of the product in some embodiments. Information identifying a product obtained from a user includes multiple pictures of the product in some embodiments, with different pictures corresponding to different positions of the product relative to an image capture device (e.g., a camera) that captured the pictures of the product. The online system 140 stores the information identifying the products offered by the user, which includes one or more pictures of each of the products in association with the user in a user profile for the user in the user profile store 205 in various embodiments. Alternatively, the online system 140 stores the obtained information describing products offered by the user in the content store 210 along with an association between the user profile of the user and the obtained information.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 are "sponsored content items" that include content for presentation to a user and for which the online system 140 receives compensation from a user from whom the online system 140 obtained the sponsored content item in exchange for presenting the content item to another user, which may be contingent on whether the other user performs a specific action after the content from the sponsored content item is displayed to the other user. In various embodiments, the content also specifies a page of content. For example, a sponsored content item includes a landing page specifying a network address of a page of content to which a user is directed when the content item is accessed. In various embodiments, a bid amount of a sponsored content item specifies an amount of compensation the online system 140 receives in exchange for displaying the sponsored content item to users. The bid amount may be used to determine an expected value, such as monetary compensation, provided by the user to the online system 140 if content in the sponsored content item is presented to a viewing user, if the content in the sponsored content item receives an interaction from the viewing user when presented, or if any suitable condition is satisfied when content in the sponsored content item is presented to a user. For example, the bid amount of a sponsored content item specifies a monetary amount that the online system 140 receives from a user who provided the sponsored content item to the online system 140 if content in the sponsored content item is displayed. In some embodiments, the expected value to the online system 140 of presenting the content from the sponsored content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items, such as sponsored content items, may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. One or more objectives may identify a specific interaction with a landing page to which a content item, such as a sponsored content item, includes a link. Example specific interactions with the landing page include: establishing a connection to the landing page via the online system 140, transmitting a message to the publishing user through the online system via a link included on the landing page, indicating a preference for one or more content items included on the landing page, selecting a link to a website in a different domain than the online system 140 included on the landing page, selecting a link on the landing page to establish a telephone call to the publishing user, purchasing one or more products via the landing page, selecting a link on the landing page to obtain directions to a physical location associated with the publishing user, selecting a link on the landing page to transmit an electronic mail message to the publishing user, and any combination thereof. Additionally, the online system 140 receives compensation from a user associated with content item as online system users perform interactions with a content item that satisfy the objective included in the content item.

Additionally, a content item, such as a sponsored content item, may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Additionally, in various embodiments, the content store 210 includes one or more content reels, with each content reel including one or more content items. A content reel includes one or more content items and an order in which the content items are displayed when the content reel is displayed. A user selects content items for inclusion in a content reel, and the content store 210 stores an identifier of content reel in association with an identifier of the user and with identifiers of content items included in the content reel, and the order in which the content items are to be displayed. In various embodiments, content items are included in a content reel for a specific amount of time, and a content item is removed from the content reel after the specific amount of time from the inclusion of the content item in the content reel. For example, the online system 140 removes an association between an identifier of a content item and an identifier of a content reel 24 hours after a time when the content item was included in the content reel by a user associated with the content reel.

The action logger 215 receives communications about user actions (or "interactions") internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a reaction to an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. In some embodiments, when determining a measure of relevance of a content item to a user, the content selection module 230 determines a likelihood of the user performing a specific interaction with a page of content to which the content item includes a link after being presented with the content item (e.g., within a threshold amount of time of the content item being presented to the user); in various embodiments, the specific interaction is associated with the content item by a publishing user from whom the online system 140 obtained the content item. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. In various embodiments, the expected value associated with a content item is a product of a bid amount included in the content item and a likelihood of the user performing a specific interaction with a landing page to which the content item includes a link after the content item is displayed to the user. The specific interaction with the landing page is specified by a publishing user from whom the online system 140 obtained the content item in various embodiments. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

In various embodiments, the content selection module 230 trains and stores one or more machine learning models that identify objects within an image, or within video, included in a content item and that determine confidences of an identified object matching a product offered by a user from whom the content item was obtained. In various embodiments, the content selection model 230 maintains one or more machine learned models trained to identify objects within an image or video and maintains a separate machine learned identification model that compares an object identified within an image or within video to pictures of products offered bur purchase by a user from whom the image or the video was obtained. As further described below in conjunction with FIG. 3, the identification model determines confidences of an object identified within an image or within video marching different products offered by the user based on characteristics of the identified object and characteristics of pictures of different products offered by the user. Based on the confidences of the identified object matching different products, the content selection module 230 presents information identifying one or more products offered by the user in conjunction with the image or the video. This allows the user to select a product offered to correlate with the identified object and to include a tag in the content item having information describing the product, as further described below in conjunction with FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
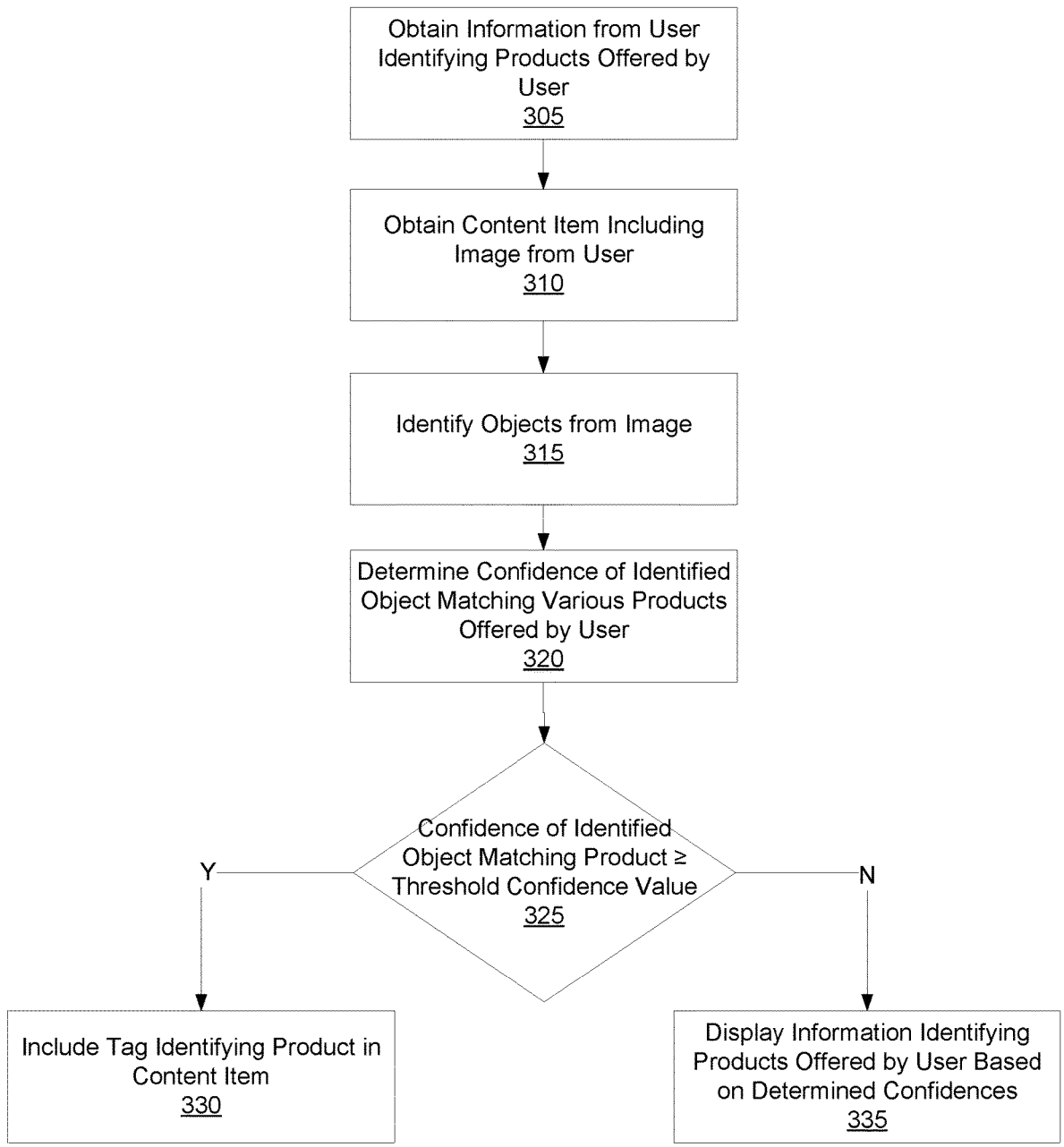
FIG. 3 is a flowchart of a method for an online system identifying products offered by a user within an image the online system obtains from the user, in accordance with an embodiment.

An Online System Identifying Products Offered by a User in an Image Received from the User FIG. 3 is a flowchart of one embodiment of a method for an online system 140 identifying products offered by a user within an image the online system 140 obtains from the user. For purposes of illustration, FIG. 3 describes the method in conjunction with identification of products offered by a user within an image obtained by the user, but the method described in conjunction with FIG. 3 may also be used to identify products offered by a user within a video obtained from the user (e.g., the method may be applied to frames of the video obtained from the user as described below in conjunction with FIG. 3 with regard to an image obtained from the user). In various embodiments, the method may include different or additional steps than those described in conjunction with FIG. 3. Additionally, in some embodiments, the method may perform the steps in different orders than the order described in conjunction with FIG. 3.

An online system 140, as further described above in conjunction with FIG. 2, obtains 305 information from a user identifying products that a user of the online system 140 offers for purchase by other users. The obtained information includes one or more images of each product associated with a product identifier, and may also include additional information about each product. The obtained information may also include one or more videos of each product associated with a product identifier. For example, the online system 140 obtains 305 a product catalog from a user that includes entries for each product offered by the user. In some embodiments, an entry in the product catalog for a product includes a product identifier of the product, one or more images of the product, a name of the product, and a price at which the user offers the product for purchase. An entry in the product catalog for a product may also include a description of the product in some embodiment. Information identifying a product obtained 305 from a user includes multiple images of the product in some embodiments, with different images corresponding to different positions of the product relative to an image capture device (e.g., a camera) that captured the images of the product. The online system 140 stores the information identifying the products offered by the user, which includes one or more images of each of the products in association with the user. For example, the online system 140 stores information identifying the products offered by the user in a user profile maintained by the online system 140 for the user or stores the obtained information identifying products offered by the user in association with a user profile identifying the user.

Additionally, the online system 140 obtains 310 a content item from the user for presentation to other users. A content item obtained 305 from a user includes an image or a video, and may also include text data or audio data. In various embodiments, a content item includes any combination of text data, audio data, image data, video data for presentation to other users via the online system 140. The online system 140 may obtain 310 the content item from the user through a composer interface displayed to the user via a client device 110 associated with the user. Via the composer interface, the user identifies an image for inclusion in the content item to the online system 140 and enters text data for inclusion in the content item for presentation in conjunction with the image.

When an image (or a video) included in the content item obtained 310 by the online system 140 includes one or more products offered by the user, the content item may include metadata identifying the products included in the image. In various embodiments, the metadata overlays information describing a product on a portion of the image including the product when a user viewing the content item performs a specific action. For example, if a user viewing the content item accesses or selects the portion of the image including the product, information describing the product, such as a name of the product and a price of the product, are overlaid on the portion of the image including the product. In some embodiments, the information describing the product includes a link that retrieves a page or a website including information about the product or for purchasing the product when selected by the user viewing the image including the product. While this allows other users to more easily identify products offered by the user from the content item, conventional methods for identifying a user's products in an image involve the user manually identifying products in the image to the online system 140. This manual identification may be time and resource intensive for the user offering the products for purchase.

To simplify identification of the user's products included in an image (or included in a video) of a content item, the online system 140 identifies 315 objects from the image included in the content item. In various embodiments, the online system 140 applies one or more object detection methods to the image of the content item that identify objects in the image within the content item. The online system 140 also identifies locations within the image of identified objects in various embodiments. For example, the online system 140 generates a bounding box surrounding each object identified in the image within the content item. In various embodiments, the online system 140 uses one or more object detection methods to identify 315 objects within the image and to generate bounding boxes corresponding to each of the identified objects. When identifying 315 objects from the image (or from the video), the online system 140 may also identify a category or a type for each identified object. For example, an object detection method applied by the online system 140 associates different categories with objects based on characteristics of the objects, and the online system 140 associates a type or a category from the object detection method with an identified object.

The online system 140 compares each object identified 315 from the image (or from the video) to images of products included in the information identifying products offered by the user that the online system 140 obtained 305 from the user. When comparing an object identified 315 from the image to previously obtained 305 images of products offered by the user, the online system 140 determines 320 confidences of the identified object matching different products offered by the user. To compare the object identified 315 from the image to products offered by the user, the online system 140 applies an identification model to the identified object and to the images obtained 305 from the user of products offered by the user. The online system 140 trains the machine learning identification model from comparisons of objects identified from images to products identified 305 to the online system 140 by various users, and may also account for comparisons of objects to publicly available information identifying different products when training the identification model. The online system trains the identification model to determine a likelihood of an object identified from an image matching a product based on prior matching of objects in images to different products. For example, the online system 140 applies a label indicating a product matching an object identified from the image to characteristics of the object identified from the image. From the labeled characteristics of objects extracted from images, the online system 140 trains the identification model using any suitable training method or combination of training methods (e.g., back propagation to train the identification model if it is a neural network, curve fitting techniques if the identification model is a linear regression). After training, the online system 140 applies the trained identification model to characteristics of objects identified within an image, and the identification model outputs confidences of the object matching different products.

In various embodiments, the online system 140 determines 320 confidences of the identified object matching each product offered by the user and identified to the online system 140. Alternatively, the online system 140 determines 320 confidences of the identified object matching each of a subset of products offered by the user and identified to the online system 140. In various embodiments, the online system 140 maintains a threshold confidence value and compares confidences of the identified object matching different products offered to the user to the threshold value. Responsive to the online system 140 determining 325 a confidence of the identified object matching a product offered by the user equals or exceeds the maximum confidence value, the online system 140 automatically includes 330 a tag in the content item identifying the product offered by the user to which the identified object has a confidence equaling or exceeding the maximum confidence value in some embodiments. Alternatively, responsive to the online system 140 determining 325 a confidence of the identified object matching a product offered by the user equals or exceeds the threshold confidence value, the online system 140 provides an interface to the user enabling the tag to be included in the content item. For example, the interface displays a suggestion to include 330 a tag in the content item that identifies the product offered by the user to which the identified object has a confidence equaling or exceeding the maximum confidence value. The suggestion may include an image of the product previously obtained 305 from the user, as well as other information describing the product (e.g., a name of the product, a description of the product, a price of the product, etc.). A tag corresponding to a product included in the image comprises metadata describing the product offered by the user for which the identified object has a confidence of matching equaling or exceeding the maximum confidence value. In various embodiments, the tag for the product is associated with a location in the image (or in the video) of the identified object and the metadata comprising the tag is displayed at (or proximate to) the location in the image (or the video) of the identified object when a user viewing the image (or the video) selects or performs a specific interaction with the image.

If multiple products offered by the user have confidences of matching the identified object equaling or exceeding the threshold confidence value, the online system 140 displays information identifying each product having a confidence of matching the identified object equaling or exceeding the threshold confidence value to the user via an interface. In various embodiments, the online system 140 ranks the products having confidences of matching the identified object equaling or exceeding the threshold confidence value so products with higher confidences of matching the identified object have higher positions in the ranking and displays information identifying products having confidences of matching the identified object equaling or exceeding the maximum confidence value in an order corresponding to the ranking via the interface. When the user selects displayed information identifying a specific product, the online system 140 includes 330 a tag in the content item identifying the specific product selected by the user, as further described above. In various embodiments, the online system 140 displays the image of the content item in the interface in conjunction with information identifying the products in the order based on confidences of the products matching the identified object. The interface may visually distinguish the identified object from other objects in the image to allow the user to better identify the object compared to the products. Examples of visually distinguishing the identified object include displaying a border around the identified object, increasing a brightness of the identified object, and chancing a color of the identified object, although any suitable method to visually distinguish the identified object from other objects may be used.

Responsive to determining 325 the confidence of the identified object does not equal or exceed the threshold confidence value of matching at least one product offered by the user, the online system 140 displays 335 information identifying products offered by the user to the user in conjunction with a suggestion to tag the identified object with information identifying a product offered by the user through the interface. In various embodiments, the online system 140 ranks products offered by the user based on their corresponding confidences of matching the identified object so products offered by the user with higher confidences of matching the identified object have higher positions in the ranking. The online system 140 may display 335 information identifying products offered by the user based on the ranking, so information identifying products offered by the user is displayed in an interface in an order based on the ranking. Alternatively, the online system 140 identifies a set of products offered by the user having at least a threshold position in the ranking and displays 335 information identifying the set of products based on the ranking via the interface, while displaying 335 information identifying products having less than the threshold position in the ranking (i.e., products not in the identified set) in an order based on the information obtained 305 from the user identifying the products offered for sale via the interface. For example, the online system 140 displays 335 an interface including information identifying products having the five highest positions in the ranking with relative positions based on the ranking, while displaying 335 information identifying the remaining products offered by the user in an order specified by a product catalog the online system 140 obtained 305 from the user. In various embodiments, the online system 140 displays the image (or the video) included in the content item in the interface in conjunction with information identifying the set of products ordered based on their position in the ranking and in conjunction with the information identifying the other products having lower than the threshold position in the ranking in the order based on the information identifying the products obtained 305 from the user. The interface may visually distinguish the identified object from other objects in the image to allow the user to better identify the object compared to the products. Examples of visually distinguishing the identified object include displaying a border around the identified object, increasing a brightness of the identified object, and chancing a color of the identified object, although any suitable method to visually distinguish the identified object from other objects may be used. This allows the user to more efficiently identify a product offered by the user that is included in the image (or video).

In other embodiments, the online system 140 maintains a maximum confidence value and a minimum confidence value. Responsive to the online system 140 determining a confidence of the identified object matching a product offered by the user equaling or exceeding the maximum confidence value, the online system 140 automatically includes a tag in the content item identifying the product offered by the user to which the identified object has a confidence equaling or exceeding the maximum confidence value. Alternatively, responsive to the online system 140 determining a confidence of the identified object matching a product offered by the user equaling or exceeding the maximum confidence value, the online system 140 provides an interface to the user enabling inclusion of the tag in the content item that identifies the product offered by the user to which the identified object has a confidence equaling or exceeding the maximum confidence value (e.g., displays a suggestion to include a tag in the content item that identifies the product offered by the user to which the identified object has a confidence equaling or exceeding the maximum confidence value). The suggestion may include an image of the product previously obtained 305 from the user, as well as other information describing the product (e.g., a name of the product, a description of the product, a price of the product, etc.). A tag corresponding to a product included in the image (or in the video) comprises metadata describing the product offered by the user for which the identified object has a confidence of matching equaling or exceeding the maximum confidence value. In various embodiments, the tag for the product is associated with a location in the image of the identified object and the metadata comprising the tag is displayed at (or proximate to) the location in the image of the identified object when a user viewing the image selects or performs a specific interaction with the image.

If multiple products offered by the user have confidences of matching the identified object equaling or exceeding the maximum confidence value, the online system 140 displays an interface presenting information identifying each product having a confidence of matching the identified object equaling or exceeding the maximum confidence value to the user. In various embodiments, the online system 140 ranks the products having confidences of matching the identified object equaling or exceeding the maximum confidence value so products of the subset with higher confidences of matching the identified object have higher positions in the ranking and information identifying products having confidences of matching the identified object equaling or exceeding the maximum confidence value is displayed in the interface in an order corresponding to the ranking. When the user selects displayed information identifying a specific product, the online system 140 includes 330 a tag in the content item identifying the specific product selected by the user, as further described above.

In response to determining the confidence of the identified object does not equal or exceed the maximum confidence value of matching at least one product offered by the user, the online system 140 selects a subset of products offered by the user for which the identified object has less than the maximum confidence value of matching but for which the identified object has at least the minimum confidence value of matching. The online system 140 displays information identifying products of the subset to the user via the interface, allowing the user to select a product of the subset via the interface. In response to the user selecting a product of the subset, the online system 140 includes 330 a tag in the content item identifying the product offered by the user selected by the user from the subset, as further described above. In various embodiments, when displaying 335 the information identifying products of the subset to the user, the online system 140 orders products of the subset based on their corresponding confidence values of matching the identified objects. For example, the online system 140 orders products of the subset so products of the subset with higher confidences of matching the identified object are displayed 335 before other products of the subset with lower confidences of matching the identified objects. In various embodiments, the online system 140 ranks products of the subset based on their corresponding confidences of matching the identified object so products of the subset with higher confidences of matching the identified object have higher positions in the ranking and displays information identifying products of the subset in an order corresponding to the ranking. This allows the user to more efficiently identify a product offered by the user that is included in the image (or in the video).

In response to the online system 140 determining the confidence of the identified object does not equal or exceed the minimum confidence value of matching at least one product offered by the user, the online system 140 displays information identifying the products offered to the user in conjunction with a message to the user suggesting the user select a product corresponding to the identified object. In various embodiments, the online system 140 ranks products offered by the user based on their corresponding confidences of matching the identified object so products offered by the user having higher confidences of matching the identified object have higher positions in the ranking and displays information identifying products offered by the user in an order corresponding to the ranking. In response to the user selecting a product from the displayed information identifying products offered by the user, the online system 140 includes 330 a tag in the content item identifying the product offered by the user selected by the user, as further described above.

After including 330 the tag in the content item, when the online system 140 displays the content item to other users of the online system 140, a user viewing the content item may retrieve information describing the product from the tag included 330 in the content item. For example, when a user performs a specific interaction with the content item, information identifying the product is retrieved from the tag and displayed in conjunction with the content item. In some embodiments, information identifying the product is retrieved from the tag and is displayed as an overlay on the image (or the video) in the content item at a location within the image including the object matching the product. For example, a name of the product and a price of the product is displayed at a location within the image (or the video) including the object matching the product when a user selects the content item. In some embodiments, the tag includes a link to a page or to a website that, when selected by a user to whom the image is displayed, retrieve the page or the website, causing display of the page or the website by a client device 110 displaying the content item. This allows the user offering the products for purchase to more easily distribute information identifying the products for purchase to other users by simplifying identification of the products for purchase within images (or videos) that the user distributes to other users via the online system 140. Application of the machine learned identification model to objects identified 315 from an image and to products offered for sale by the user allows the online system 140 to reduce an amount of data the user reviews to identify products within the image by identifying products having greater than a threshold confidence value of matching an identified objects or by displaying products offered by the user to the user in an order based on confidences of different products marching an object identified from the image (or from the video). This reorganizes display of information identifying products to the user to allow the user to more efficiently select a product corresponding to an object identified 315 in the image.

Figure 4A:
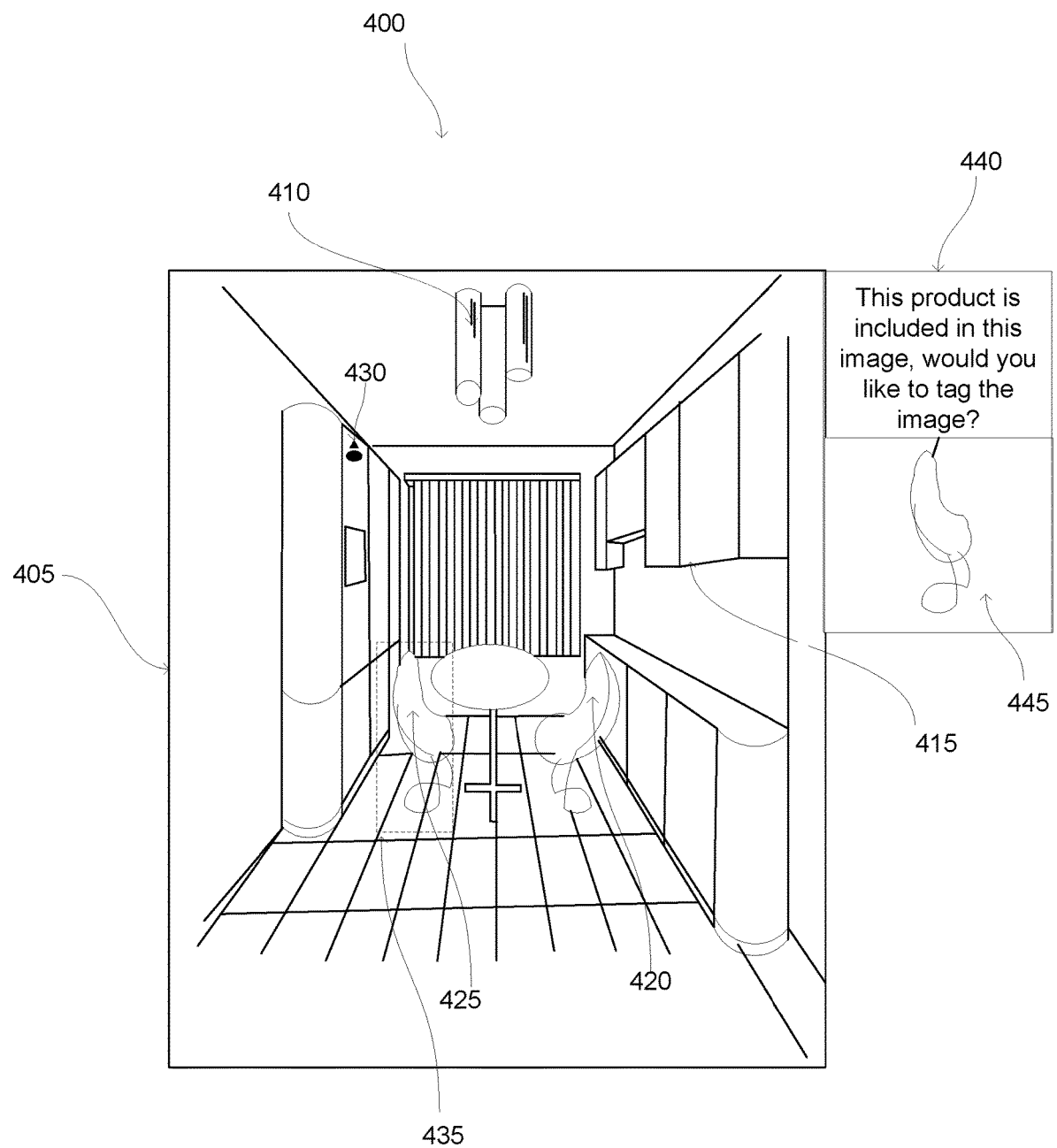
FIGS. 4A and 4B are example interfaces for an online system identifying products offered by a user within an image the online system obtains from the user, in accordance with an embodiment.
Figure 4B:
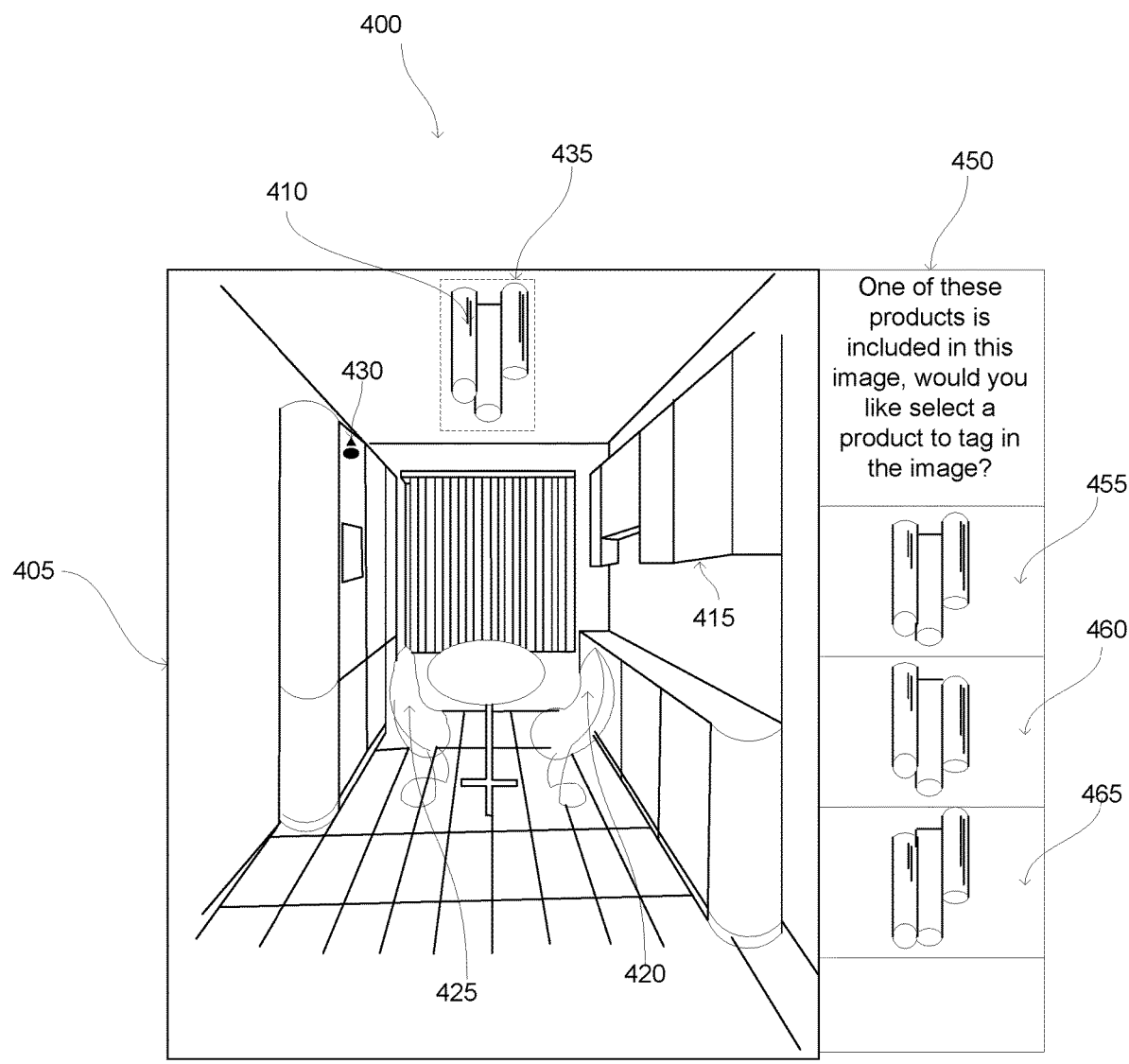

FIGS. 4A and 4B are example interfaces 400 for an online system 140 identifying products offered by a user within an image the online system 140 obtains from the user. While FIGS. 4A and 4B show interfaces 400 for identifying products offered by a user within a video the online system 140 obtains from the user. In the examples of FIGS. 4A and 4B, the online system 140 received an image 405 from the user including multiple objects 410, 415, 420, 425, 430. As further described above in conjunction with FIG. 3, the online system 140 also received information identifying products offered by the user. As further described above in conjunction with FIG. 3, the information identifying the products offered by the user includes images of different products offered by the user.

The online system 140 identifies objects 410, 415, 420, 425, 430 included in the image 405, as further described above in conjunction with FIG. 3. Additionally, the online system 140 applies an identification model, further described above in conjunction with FIG. 3, to different objects 410, 415, 420, 425, 430 identified within the image 405 and to the information identifying different products offered by the user. As further described above in conjunction with FIG. 3, the identification model determines a confidence of an object 410, 415, 420, 425, 430 included in the image 405 matching each product of a set of products offered by the user based on the images of each of the set of products obtained from the user. In the example of FIG. 4A, the online system 140 is applying the identification model to object 425, so the interface 400 visually distinguishes object 425 from objects 410, 415, 420, 430. For purposes of illustration, the interface 400 in FIG. 4A displays a bounding box 435 surrounding object 425 to visually distinguish object 425 from objects 410, 415, 420, 430. However, in other embodiments, the interface 400 uses any suitable method to visually distinguish object 425 from other objects 410, 415, 420, 430.

In the example of FIG. 4A, the identification model applied by the online system 140 to object 425 determines that object 425 has at least a threshold confidence value of matching product 445, which is identified by information from the user obtained by the online system 140. Responsive to the confidence of object 425 matching product 445 equaling or exceeding the threshold confidence value, the online system 140 displays a suggestion 440 for the user to tag object 425 in the image 405 with information identifying product 445. In the example of FIG. 4, the suggestion 440 includes an image or other information describing product 445 and a prompt for the user to include a tag in the image 405 identifying product 445. However, in other embodiments, the online system 140 automatically includes a tag including information identifying product 445 in the image 405 at a location corresponding to object 425.

FIG. 4B shows the interface 400 when the online system 140 applies the identification model to object 410, with the interface 400 visually distinguishing object 410 from objects 415, 420, 425, 430. For purposes of illustration, the interface 400 in FIG. 4A displays a bounding box 435 surrounding object 410 to visually distinguish object 410 from objects 415, 420, 425, 430. However, in other embodiments, the interface 400 uses any suitable method to visually distinguish object 410 from other objects, 415, 420, 425, 430. When applying the identification model to object 410, the online system 140 determines that object 410 does not have at least the threshold confidence value of matching a product offered by the user, so the online system 140 generates the interface 400 to display the image 405 and a suggestion 450 to tag the image 405 with a product along with information identifying each of a set of products. In the example shown in FIG. 4B, the suggestion 405 displays information identifying different products of the set in an order based on confidences of different products of the set matching object 410 so products with higher confidences have higher positions in the order. As shown in FIG. 4B, product 455 has a highest confidence of matching object 410, product 460 has a second highest confidence of matching object 410, and product 645 has a third highest confidence of matching product 645. Hence, the suggestion 450 displayed by the interface 400 displays information identifying product 455 in a first position, information identifying product 460 in a second position, and information identifying product 645 in a third position. In some embodiments, the suggestion 450 displays information identifying a subset of products in an order based on their corresponding confidences of matching object 410, while displaying information displaying other products not in the subset in a different order. For example, the suggestion 450 displays information identifying products not in the subset in an order based on the information obtained from the user identifying products offered by the user. The online system 140 may display information identifying a specific number of products having the highest confidences matching product 410 in an order based on their corresponding confidences of matching product 410, while displaying information identifying other products in an order based on information previously obtained from the user identifying products offered by the user. For example, the suggestion 450 displays information identifying products offered by the user having the three highest confidences of matching object 410 in an order based on their corresponding confidences, while displaying information identifying products having less the third highest confidence of matching object 410 in an order based on information obtained from the user identifying products offered by the user.

In response to the user selecting one of product 455, 460, 465 in FIG. 4B, the online system 140 includes a tag in image 405 identifying the selected one of product 455, 460, 465 in association with object 410. For example, the tag includes a link to a page having additional information about the selected one of product 455, 460, 465 or a link to a page for purchasing the selected one of product 455, 460, 465. The tag may alternatively or additionally include a name or a description of the selected one of product 455, 460, 465 and a price of the selected one of product 455, 460, 465. As further described above in conjunction with FIG. 3, after including the tag in the image 405, when another user to whom the image 405 including the tag is displayed performs a specific interaction with the image 405, information from the tag is displayed in conjunction with the image 405. For example, in FIG. 4B, when a user viewing the image 405 including the tag selects the image 405, information from the tag is overlaid on the image 405 in a location proximate to object 410. Thus, displaying the suggestion 405 including products offered by the user in conjunction with the image 405 via the interface 400 allows the online system 140 to more efficiently present information about products to the user, reducing an amount of information for the user to review to identify products within the image 405.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   obtaining, at an online system, a product catalog containing information identifying each of a plurality of products offered by a user of the online system, the obtained information including one or more pictures of different products;

receiving, at the online system, a request to post a content item from the user for presentation to other users by the online system, the content item including an image;

determining, by the online system, confidences of an object identified in the image matches each of a set of products offered by the user by applying an identification model to the identified object and to pictures of each product of the set, the identification model outputting a confidence of the object identified in the image matching a product of the set and the identification model trained using back propagation through a neural network comprising the identification model by the online system applying the identification model to characteristics of objects previously identified from images to which corresponding labels are applied indicating a product of the set matching a previously identified object and corresponding labels;

determining that the identified object has a confidence of matching a product of the set output by the identification model equaling or exceeding a threshold confidence value;

responsive to the determining:
  generating, by the online system, a tag that includes metadata describing the product of the set for which the identified object has the confidence equaling or exceeding the threshold confidence value,
  automatically including the tag in the content item by the online system, and
  distributing the content item with the included tag as a post by the online system to one or more of the other users of the online system;

receiving, at the online system, a second request to post a second content item from the user for presentation to other users by the online system, the second content item including a second image;

determining, by the online system, a confidence that an object identified in the second image matches each of a set of products offered by the user by applying the identification model to the identified object and to pictures of each product of the set;

determining that the object identified in the second image has a confidence of matching each of a set of products output by the identification model being less than the threshold confidence value;

ranking products of the set of products based on the confidences of the identified object matching different products of the set;

selecting products of the set having at least a threshold position in the ranking;

displaying information identifying each of the selected products to the user in an order corresponding to positions of the selected objects in the ranking via an interface;

receiving a user selection of one of the selected products;

generating, by the online system, a tag that includes metadata describing the user-selected product of the set;

including the tag in the second content item by the online system, and distributing the second content item with the included tag as a post by the online system to one or more of the other users of the online system.

2. The method of claim 1, wherein displaying information identifying each of the selected products to the user in an order corresponding to positions of the selected objects in the ranking via the interface comprises:
  displaying the image included in the content item and the information identifying each of the selected products in the order corresponding to positions of the selected objects in the ranking in the interface.

3. The method of claim 1, further comprising:
  displaying information identifying other products of the set to the user having less than the threshold position in the ranking in an order corresponding to the information identifying the products offered by the user via the interface.

4. The method of claim 3, wherein displaying information identifying other products of the set to the user having less than the threshold position in the ranking in the order corresponding to the information identifying the products offered by the user via the interface comprises:
  displaying the image included in the content item in the interface, displaying the information identifying each of the selected products in the order corresponding to positions of the selected objects in the ranking in the interface, and displaying the information identifying the other products of the set in the order corresponding to the information identifying the products offered by the user in the interface.

5. The method of claim 1, further comprising:
  displaying a suggestion to include the tag in the content item in an interface displaying the image and the product of the set for which the identified object has the confidence equaling or exceeding the threshold confidence value; and
  including the tag in the content item in response to receiving a selection of the product of the set for which the identified object has the confidence equaling or exceeding the threshold confidence value.

6. The method of claim 1, further comprising;
  displaying the content item including the tag to another user; and
  displaying the metadata describing the product of the set for which the identified object has the confidence equaling or exceeding the threshold confidence value to the other user in conjunction with the image in response to receiving a specific interaction with the content item by the other user.

7. The method of claim 1, wherein the metadata describing the product of the set for which the identified object has the confidence equaling or exceeding the threshold confidence value comprises a name of the product of the set for which the identified object has the confidence equaling or exceeding the threshold confidence value.

8. The method of claim 7, wherein the metadata describing the product of the set for which the identified object has the confidence equaling or exceeding the threshold confidence value further comprises a price of the product of the set for which the identified object has the confidence equaling or exceeding the threshold confidence value from the user.

9. The method of claim 1, wherein the metadata describing the product of the set for which the identified object has the confidence equaling or exceeding the threshold confidence value comprises a link to a page including information about the product.

10. A computer program product comprising a non-transitory computer readable storage medium having instructions encoded thereon that, when executed by a processor cause the processor to:

obtain, at an online system, a product catalog containing information identifying each of a plurality of products offered by a user of the online system, the obtained information including one or more pictures of different products;

receive, at the online system, a request to post a content item from the user for presentation to other users by the online system, the content item including an image;

determine, by the online system, confidences of an object identified in the image matches each of a set of products offered by the user by applying an identification model to the identified object and to pictures of each product of the set, the identification model outputting a confidence of the object identified in the image matching a product of the set and the identification model trained using back propagation through a neural network comprising the identification model by the online system applying the identification model to characteristics of objects previously identified from images to which corresponding labels are applied indicating a product of the set matching a previously identified object and corresponding labels;

determine that the identified object has a confidence of matching a product of the set output by the identification model equaling or exceeding a threshold confidence value;

responsive to the determining:
generate, by the online system, a tag that includes metadata describing the product of the set for which the identified object has the confidence equaling or exceeding the threshold confidence value,
automatically include the tag in the content item by the online system, and
distribute the content item with the included tag as a post by the online system to one or more of the other users of the online system;

receive, at the online system, a second request to post a second content item from the user for presentation to other users by the online system, the second content item including a second image;

determine, by the online system, a confidence that an object identified in the second image matches each of a set of products offered by the user by applying the identification model to the identified object and to pictures of each product of the set;

determine that the object identified in the second image has a confidence of matching each of a set of products output by the identification model being less than the threshold confidence value;

rank products of the set of products based on the confidences of the identified object matching different products of the set;

select products of the set having at least a threshold position in the ranking;

display information identifying each of the selected products to the user in an order corresponding to positions of the selected objects in the ranking via an interface;

receive a user selection of one of the selected products;

generate, by the online system, a tag that includes metadata describing the user-selected product of the set;

include the tag in the second content item by the online system, and distribute the second content item with the included tag as a post by the online system to one or more of the other users of the online system.

11. The computer program product of claim 10, wherein display information identifying each of the selected products to the user in an order corresponding to positions of the selected objects in the ranking via the interface comprises:
display the image included in the content item and the information identifying each of the selected products in the order corresponding to positions of the selected objects in the ranking in the interface.

12. The computer program product of claim 10, wherein the non-transitory computer readable storage medium further has instructions encoded thereon that, when executed by the processor, cause the processor to:
display information identifying other products of the set to the user having less than the threshold position in the ranking in an order corresponding to the information identifying the products offered by the user via the interface.

13. The computer program product of claim 12, wherein display information identifying other products of the set to the user having less than the threshold position in the ranking in the order corresponding to the information identifying the products offered by the user via the interface comprises:
display the image included in the content item, display the information identifying each of the selected products in conjunction with the image, and display the information identifying the other products of the set in the order corresponding to the information identifying the products offered by the user via the interface.

14. The computer program product of claim 10, wherein the non-transitory computer readable storage medium further has instructions encoded thereon that, when executed by the processor, cause the processor to:
display a suggestion to include the tag in the content item in an interface displaying the image and the product of the set for which the identified object has the confidence equaling or exceeding the threshold confidence value; and
include the tag in the content item in response to receiving a selection of the product of the set for which the identified object has the confidence equaling or exceeding the threshold confidence value.

15. The computer program product of claim 10, wherein the non-transitory computer readable storage medium further has instructions encoded thereon that, when executed by the processor, cause the processor to;
display the content item including the tag to another user; and
display the metadata describing the product of the set for which the identified object has the confidence equaling or exceeding the threshold confidence value to the other user in conjunction with the image in response to receiving a specific interaction with the content item by the other user.

16. The computer program product of claim 10, wherein the metadata describing the product of the set for which the identified object has the confidence equaling or exceeding the threshold confidence value comprises a name of the product of the set for which the identified object has the confidence equaling or exceeding the threshold confidence value.

17. The computer program product of claim 16, wherein the metadata describing the product of the set for which the identified object has the confidence equaling or exceeding the threshold confidence value further comprises a price of the product of the set for which the identified object has the confidence equaling or exceeding the threshold confidence value from the user.

18. The computer program product of claim 10, wherein the metadata describing the product of the set for which the identified object has the confidence equaling or exceeding the threshold confidence value comprises a link to a page including information about the product.

* * * * *